(12) United States Patent
Yin et al.

(10) Patent No.: US 11,379,000 B2
(45) Date of Patent: Jul. 5, 2022

(54) STRUCTURE OF ELECTRONIC DEVICE AND ELECTRONIC DEVICE

(71) Applicant: HUAWEI TECHNOLOGIES CO., LTD., Guangdong (CN)

(72) Inventors: Bangshi Yin, Beijing (CN); Jianhong Luo, Beijing (CN); Shenghui Cao, Beijing (CN); Dong Ma, Beijing (CN); Wenping Guo, Shenzhen (CN); Yang Guo, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 177 days.

(21) Appl. No.: 16/755,304

(22) PCT Filed: Oct. 13, 2017

(86) PCT No.: PCT/CN2017/106156
§ 371 (c)(1),
(2) Date: Apr. 10, 2020

(87) PCT Pub. No.: WO2019/071603
PCT Pub. Date: Apr. 18, 2019

(65) Prior Publication Data
US 2021/0103312 A1 Apr. 8, 2021

(51) Int. Cl.
*G06F 1/16* (2006.01)
*G06F 21/32* (2013.01)

(52) U.S. Cl.
CPC .............. *G06F 1/16* (2013.01); *G06F 1/1684* (2013.01); *G06F 21/32* (2013.01)

(58) Field of Classification Search
CPC .......... G06F 1/16; G06F 21/32; G06F 1/1626; G06F 1/1684
See application file for complete search history.

(56) References Cited

U.S. PATENT DOCUMENTS

2016/0033342 A1  2/2016  Lyon et al.
2017/0285746 A1* 10/2017 Kim ................... G06K 9/00013
2018/0011565 A1*  1/2018 Nekimken ............ G06F 3/0445

FOREIGN PATENT DOCUMENTS

| CN | 205375506 U | 7/2016 |
| CN | 205656637 U | 10/2016 |
| CN | 106095195 A | 11/2016 |
| CN | 205788218 U | 12/2016 |

(Continued)

*Primary Examiner* — Jonathan A Boyd (57) ABSTRACT

A structure of an electronic device and an electronic device are disclosed. The structure includes: a cover, a fingerprint decorative component, and a fingerprint sensor. The cover covers a surface of the electronic device, and the cover has a first through hole. The fingerprint decorative component is built in the first through hole, the fingerprint decorative component includes a side wall of the fingerprint decorative component and a bottom wall of the fingerprint decorative component that are integrally connected, the side wall of the fingerprint decorative component is fastened to the cover by using glue. The fingerprint sensor is accommodated in the fingerprint decorative component. The fingerprint decorative component is fastened to the cover by using the glue, and no additional fastening plate and screw is required for fastening, thereby improving overall space utilization of the electronic device.

21 Claims, 4 Drawing Sheets

(56) References Cited

FOREIGN PATENT DOCUMENTS

| CN | 205959216 U | 2/2017 |
| CN | 106909200 A | 6/2017 |
| CN | 107133582 A | 9/2017 |
| CN | 104951159 B | 9/2018 |

* cited by examiner

STRUCTURE OF ELECTRONIC DEVICE AND ELECTRONIC DEVICE

CROSS-REFERENCE TO RELATED APPLICATIONS

This application is a National Stage of International Application No. PCT/CN2017/106156, filed on Oct. 13, 2017, which is hereby incorporated by reference in its entirety.

TECHNICAL FIELD

This application relates to the field of communications technologies, and more specifically, to a structure that is applied to an electronic device and that includes a fingerprint sensor and a fingerprint decorative component, and an electronic device.

BACKGROUND

Electronic devices such as mobile phones, tablet computers, or notebook computers are increasingly widely applied. Electronic devices feature increasingly powerful functions and increasingly high device complexity. In addition, to meet the portability requirement on electronic devices, electronic devices tend to be lighter and thinner.

Key components of electronic devices are optimized in design to reduce space occupied by these components. For example, a size of a fingerprint sensor in the front of a mobile phone is optimized to horizontally and vertically reduce its occupied space. A screen-to-body ratio of the mobile phone is increased through horizontal optimization, and a thickness of the mobile phone is decreased through vertical optimization, thereby improving user experience. Therefore, it becomes a mainstream pursuit in the industry to optimize a structure and a size of a fingerprint sensor.

SUMMARY

Technical problems solved by embodiments of the present disclosure include providing a structure that is applied to an electronic device and that includes a fingerprint sensor and a fingerprint decorative component, and an electronic device, to reduce the space occupied by the fingerprint sensor and the fingerprint decorative component.

Therefore, according to a first aspect of the present disclosure, a structure of an electronic device is provided, including: a cover, a fingerprint decorative component, and a fingerprint sensor. The cover covers a surface of the electronic device, and the cover has a first through hole. The fingerprint decorative component is built in the first through hole, the fingerprint decorative component includes a side wall and a bottom wall that are integrally connected, the side wall of the fingerprint decorative component is fastened to the cover by using glue, and the bottom wall of the fingerprint decorative component has a second through hole. The fingerprint sensor is accommodated in the fingerprint decorative component, and is fixedly connected to the bottom wall of the fingerprint decorative component, and a cable of the fingerprint sensor is led out from the second through hole.

According to the first aspect, in a first possible implementation of the first aspect, in the structure of the electronic device, the cover includes a first surface and a second surface, and the cover has a first slope in a direction from the first surface to the first through hole; and the side wall of the fingerprint decorative component has a second slope in a direction from the bottom wall of the fingerprint decorative component to the cover, the second slope and the first slope form a funnel-shaped opening, and the funnel-shaped opening is filled with the glue.

According to the first possible implementation of the first aspect, in a second possible implementation of the first aspect, in the structure of the electronic device, an opening angle of the funnel-shaped opening formed by the second slope and the first slope ranges from 60° to 120°.

With reference to the foregoing aspects and the possible implementations, in a third possible implementation of the first aspect, the cover includes the first surface and the second surface, and the cover has a third slope in a direction from the second surface to the first through hole; and the side wall of the fingerprint decorative component has an annular protrusion close to the third slope, and a protruding direction of the annular protrusion fits a direction of the third slope of the cover.

With reference to the third possible implementation of the first aspect, in a fourth possible implementation of the first aspect, in the structure of the electronic device, there is a gap between the annular protrusion and the third slope, and a size of the gap is less than a size of a minimum gap from which the glue is able to flow out before the glue is cured.

With reference to the third possible implementation or the fourth possible implementation of the first aspect, in a fifth possible implementation of the first aspect, a surface, opposite to the cover, of the annular protrusion is parallel to the third slope, and an acute angle between the third slope and the second surface of the cover ranges from 30° to 60°.

With reference to the foregoing aspect and the possible implementations, in a possible implementation, the cover includes the first surface and the second surface, and the cover has the first slope in the direction from the first surface to the first through hole; the side wall of the fingerprint decorative component has the second slope in the direction from the bottom wall of the fingerprint decorative component to the cover, the second slope and the first slope form the funnel-shaped opening, and the funnel-shaped opening is filled with the glue; the cover includes the first surface and the second surface, and the cover has the third slope in the direction from the second surface to the first through hole; the side wall of the fingerprint decorative component has the annular protrusion close to the third slope, and the annular protrusion fits the direction of the third slope of the cover; and the side wall of the fingerprint decorative component has a recess between the second slope and the annular protrusion, and the recess is also filled with the glue.

With reference to the foregoing aspect and the possible implementations, in a possible implementation, an elastic modulus of the glue ranges from 80 Mpa to 200 Mpa.

With reference to the foregoing aspect and the possible implementations, in a possible implementation, the glue is made from acrylic acid and fumed silica, or the glue is made from modified silicone gel or modified epoxy resin.

With reference to the foregoing aspect and the possible implementations, in a possible implementation, the fingerprint decorative component is made of metal, ceramic, plastic, or glass.

With reference to the foregoing aspect and the possible implementations, in a possible implementation, the side wall of the fingerprint decorative component is in a circular or track shape, and a height of the side wall of the fingerprint decorative component ranges from 0.5 mm to 1.2 mm.

With reference to the foregoing aspect and the possible implementations, in a possible implementation, the electronic device further includes a connector. The connector is disposed between an inner side of the bottom wall of the fingerprint decorative component and the fingerprint sensor, and when a thickness of the connector allows the fingerprint sensor to be accommodated in the fingerprint decorative component, the height of the fingerprint sensor is not larger than that of the side wall of the fingerprint decorative component. Optionally, the connector is a foam tape.

With reference to the foregoing aspect and the possible implementations, in a possible implementation, the fingerprint sensor includes: a fingerprint recognition chip and a package of the fingerprint recognition chip; a fingerprint cover, where the fingerprint cover covers the fingerprint recognition chip and the package of the fingerprint recognition chip; and the cable, where the cable includes a lead electrically connected to the fingerprint recognition chip and the package of the fingerprint recognition chip, and a flexible circuit board electrically is connected to the lead.

According to a second aspect of the present disclosure, an electronic device is further provided. The electronic device includes the structure in the first aspect and the possible implementations of the first aspect.

In comparison with a structure in the prior art, in the structure of the electronic device provided in the embodiments of the present disclosure, the fingerprint decorative component is fastened to the cover by using the glue, and no additional fastening plate and screw is required for fastening. In this way, an overall thickness and space occupied after the fingerprint sensor and the fingerprint decorative component are mounted are reduced, thereby improving overall space utilization of the electronic device. In addition, the glue has a waterproof function, so that a waterproof capability of the component is ensured, and a structure such as a waterproof ring is saved, thereby reducing manufacturing costs.

DESCRIPTION OF EMBODIMENTS

Embodiments of the present disclosure provide a structure that is applied to an electronic device and that includes a fingerprint sensor and a fingerprint decorative component, and an electronic device, to prevent a card tray from being reversely inserted, and to reduce the space occupied by the fingerprint sensor and the fingerprint decorative component.

The term "include", "may include", "comprise", or "may comprise" used in present disclosure indicates existence of corresponding functions, operations, elements, and the like disclosed herein, and does not limit one or more other functions, operations, elements, and the like. In addition, the term "include" or "comprise" indicates existence of corresponding features, quantities, steps, operations, elements, components, or a combination thereof disclosed in this disclosure, without excluding existence or addition of one or more other features, quantities, steps, operations, elements, components, or a combination thereof.

The term "A or B", "at least one of A or/and B", or "one or more of A or/and B" used herein includes any one or all combinations of words enumerated with them. For example, "A or B", "at least one of A and B", or "at least one of A or B" describes the following three cases: (1) A is included; (2) B is included; or (3) both A and B are included.

Although the terms such as "first" and "second" may modify various elements in various embodiments, the terms do not limit corresponding elements. For example, the terms do not limit a sequence and/or importance of the corresponding elements. The terms may be used to distinguish one element from another element. For example, both a first through hole and a second through hole are through holes, but the first through hole and the second through hole indicate different through holes. For example, without departing from the scope of this disclosure, the first through hole may be named the second through hole, and similarly, the second through hole may be named the first through hole.

An electronic device in the following embodiments may be an electronic device with a fingerprint recognition function. For example, the electronic device may be a mobile phone, may be a wearable electronic device, or may be a portable electronic device such as a tablet computer.

The following describes the embodiments of this disclosure in detail with reference to the accompanying drawings by using an example in which the electronic device is a mobile phone. Specific implementations described herein are merely intended to explain embodiments of this disclosure, but are not intended to limit embodiments of this disclosure.

Figure 1:
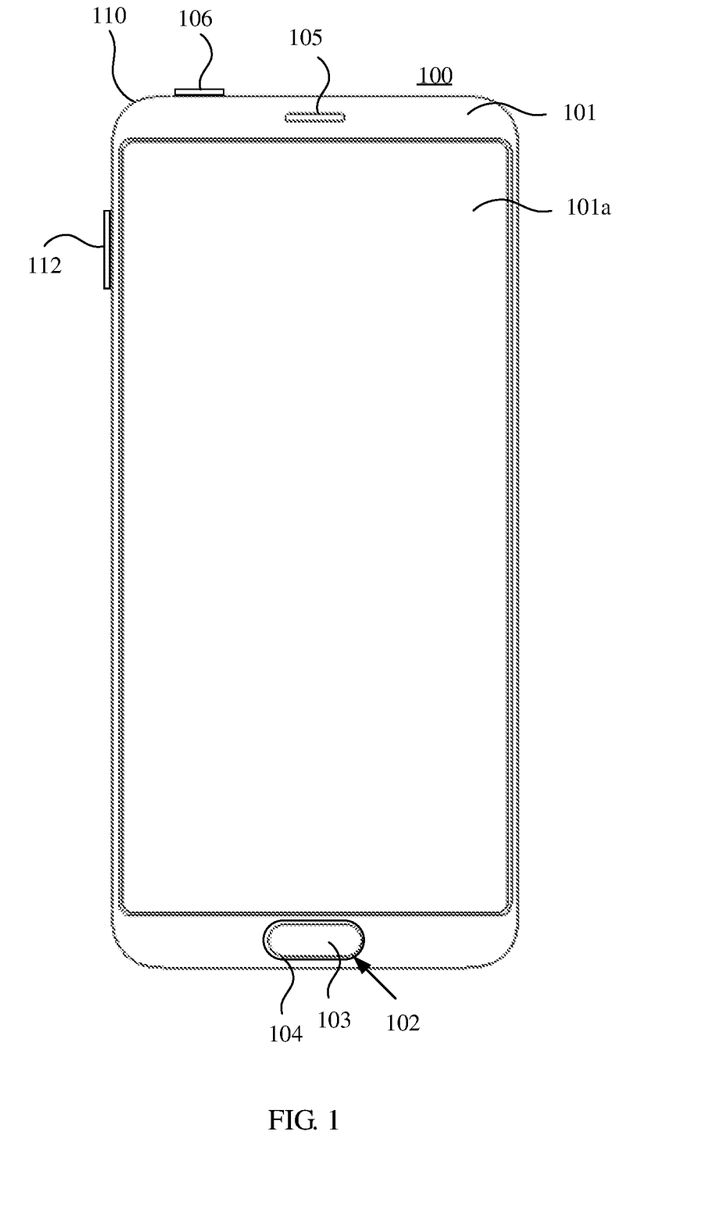
FIG. 1 is a schematic structural diagram of an electronic device according to an embodiment of this disclosure.

As shown in FIG. 1, a mobile phone 100 includes a housing 110, a cover 101, a touch-sensitive display (not shown), a fingerprint sensor 103, and the like. In addition, the mobile phone 100 may further include an earpiece 105, a power button 106, a volume button 112, and the like.

The cover 101 and the housing 110 jointly form a cavity. A circuit component (not shown) of the mobile phone 100 is accommodated in the cavity. The circuit component may include various processing chips, memories, batteries, circuit boards, and the like. The cover 101 covers a surface of the touch-sensitive display. The touch-sensitive display is located in the cavity and below a display region 101a of the cover 101. The cover 101 may be made of a transparent material such as glass, ceramic, or plastic. Content on the touch-sensitive display may be displayed through the cover 101. When a finger or a stylus touches or approaches the cover 101, the touch-sensitive display may detect a touch action such as tap, slide, or touch and hold, and a processing chip performs a corresponding operation based on the touch operation.

As shown in FIG. 1, a fingerprint decorative component 104 is built in a first through hole 102, and the fingerprint sensor 103 is accommodated in the fingerprint decorative component 104.

Figure 2:
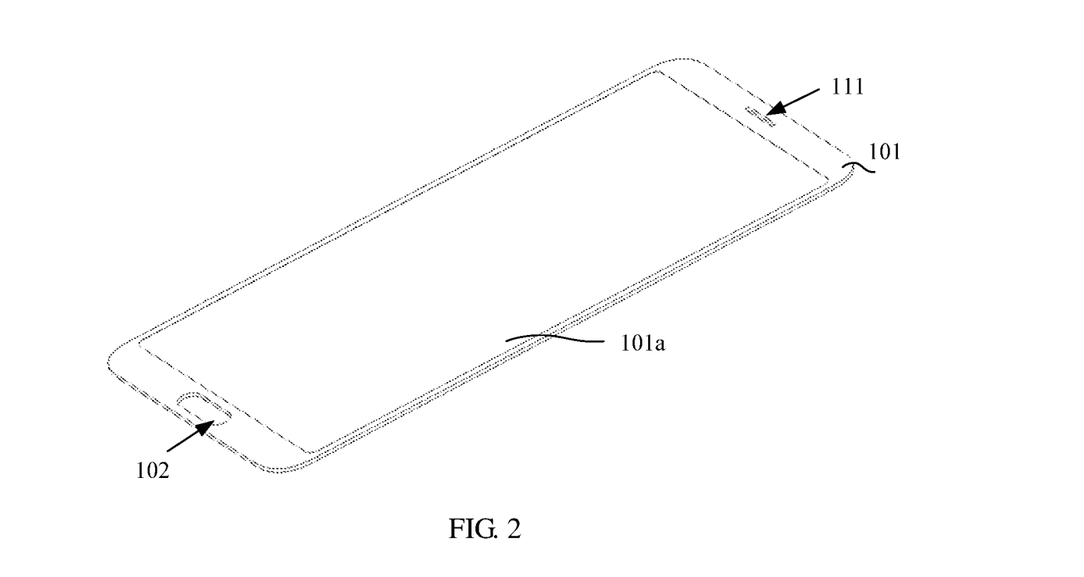
FIG. 2 is a schematic structural diagram of a cover in an electronic device according to an embodiment of this disclosure.

With reference to FIG. 1 and FIG. 2, in this embodiment of this disclosure, the cover 101 has at least one through hole. The fingerprint sensor 103 is built in one through hole (referred to as the first through hole 102 in the following) by using the fingerprint decorative component 104. The cover 101 may further have another through hole 111, and a sound outlet of the earpiece 105 is connected to the through hole 111, to output sound through the through hole 111. In addition, the cover 101 may be further designed to have yet another through hole for a component.

Figure 3:
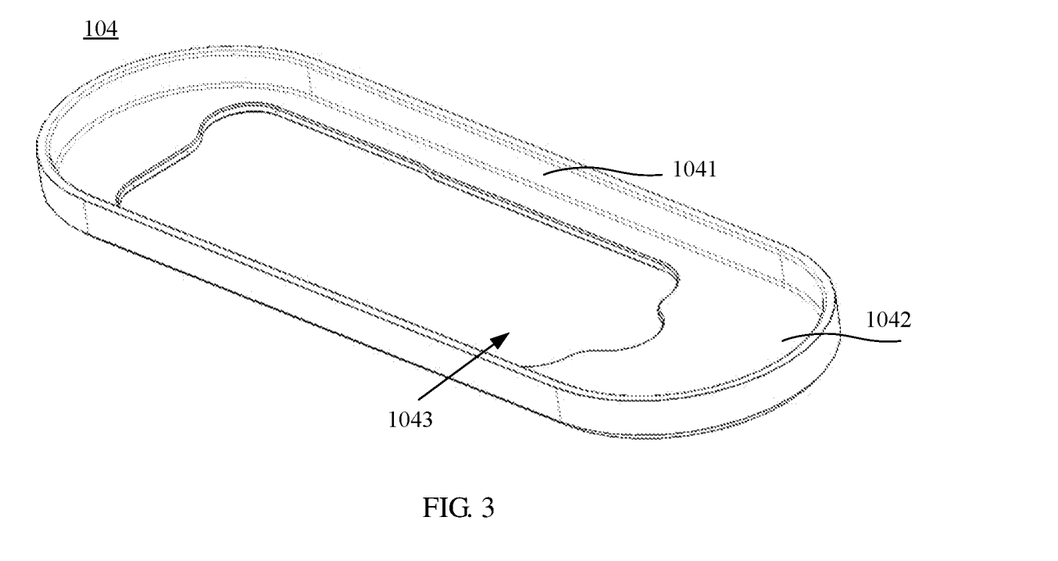
FIG. 3 is a schematic structural diagram of a fingerprint decorative component according to an embodiment of this disclosure.

As shown in FIG. 3, the fingerprint decorative component 104 includes a side wall 1041 of the fingerprint decorative component 104 and a bottom wall 1042 of the fingerprint decorative component 104 that are integrally connected, and the bottom wall 1042 of the fingerprint decorative component 104 has a second through hole 1043. The fingerprint decorative component 104 may be in a circular shape or in a track shape shown in FIG. 3. The circular shape may be more similar to a finger shape, and therefore achieves a better recognition effect and better user experience. The track shape may help obtain a larger display region. Alternatively, the fingerprint decorative component 104 may be in any other shape such as a square. Alternatively, the shape of the fingerprint decorative component 104 may be specifically designed based on an architecture layout of the electronic device and a shape of the fingerprint sensor 103. A height of the side wall 1041 of the fingerprint decorative component 104 may range from 0.5 mm to 1.2 mm, for example, 0.6 mm, 0.7 mm, 0.8 mm, 0.9 mm, 1.0 mm, or 1.1 mm.

The fingerprint decorative component 104 may be made of metal such as stainless steel, aluminum alloy, gold, or platinum, or may be made of ceramic, glass, or the like. The metal material and the ceramic have reliable mechanical strength, and can improve the aesthetic feeling of overall appearance of the electronic device. In addition, the fingerprint decorative component 104 may alternatively be made of a plastic material, a polymer material, or the like.

Figure 4:
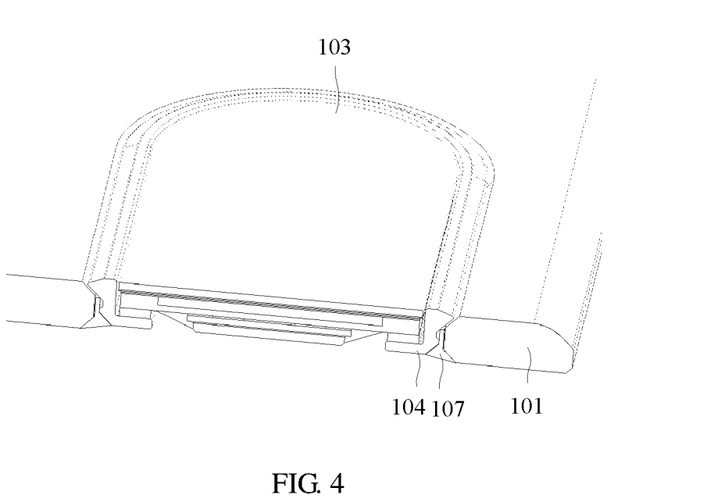
FIG. 4 is a schematic diagram of a local three-dimensional sectional view of a structure that includes a fingerprint sensor and a fingerprint decorative component according to an embodiment of this disclosure.

As shown in FIG. 4, the fingerprint decorative component 104 is built in the first through hole 102, and the fingerprint sensor 103 is accommodated in the fingerprint decorative component 104. The fingerprint decorative component 104 is fastened to the cover 101 by using glue 107, and no additional fastening plate and fastening screw are required below the fingerprint decorative component 104. Therefore, an overall thickness after the fingerprint sensor 103 and the fingerprint decorative component 104 are mounted may be decreased. In addition, no outer fastening lug is required on the bottom wall of the fingerprint decorative component 104. Therefore, a horizontally occupied area is decreased, an area of the display region 101a is increased, and a screen-to-body ratio of the mobile phone 100 is increased, thereby optimizing an internal component space layout of the mobile phone 100.

With reference to FIG. 3 and FIG. 4, a waterproof function is further achieved when the side wall 1041 of the fingerprint decorative component 104 is connected to the cover 101 by using the glue 107, so that liquid is prevented from entering the cavity of the mobile phone 100 through a gap between the side wall 1041 of the fingerprint decorative component 104 and the cover 101. Therefore, no additional waterproof ring needs to be added between the side wall 1041 of the fingerprint decorative component 104 and the cover 101, thereby lowering a mounting requirement and reducing manufacturing costs.

Figure 5:
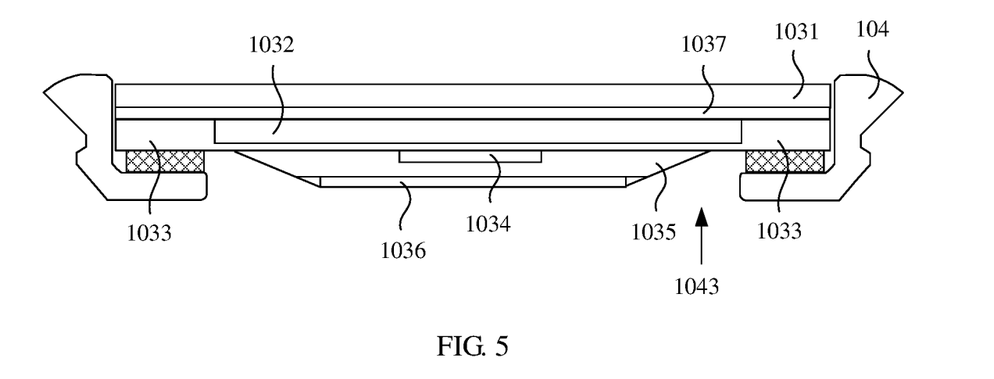
FIG. 5 is a schematic structural diagram of a fingerprint sensor according to an embodiment of this disclosure.

As shown in FIG. 5, in some embodiments, the fingerprint sensor 103 includes a fingerprint cover 1031, a fingerprint recognition chip 1032, and a package 1033 of the fingerprint recognition chip 1032. The fingerprint cover 1031 may be made of ceramic or glass. When the fingerprint cover 1031 is made of ceramic, a thickness of the fingerprint cover 1031 may range from 0.05 mm to 0.20 mm, for example, 0.12 mm. When the fingerprint cover 1031 is made of glass, a thickness of the fingerprint cover 1031 may range from 0.10 mm to 0.30 mm, for example, 0.175 mm or 0.18 mm. A cable includes a lead 1034 electrically connected to the fingerprint recognition chip 1032 and the package 1033 of the fingerprint recognition chip 1032, and a flexible circuit board 1036 electrically connected to the lead 1034. In addition, the fingerprint sensor 103 may further include an additional layer 1037, for example, an ink layer, a glue layer, or a coating layer, disposed between the fingerprint recognition chip 1032 and the glass cover 1031, waterproof glue 1035 that wraps the lead 1034, and the like. Details are not described.

The fingerprint sensor 103 is configured to recognize a fingerprint. When a finger is placed on the fingerprint sensor 103, the fingerprint sensor 103 may detect a fingerprint pattern of the finger, and the processing chip performs a corresponding operation based on the detected fingerprint pattern of the finger. In some embodiments, the fingerprint sensor 103 may be further configured to recognize a touch action, for example, tap, slide, or touch and hold, of a finger on the fingerprint sensor 103.

Figure 6A:
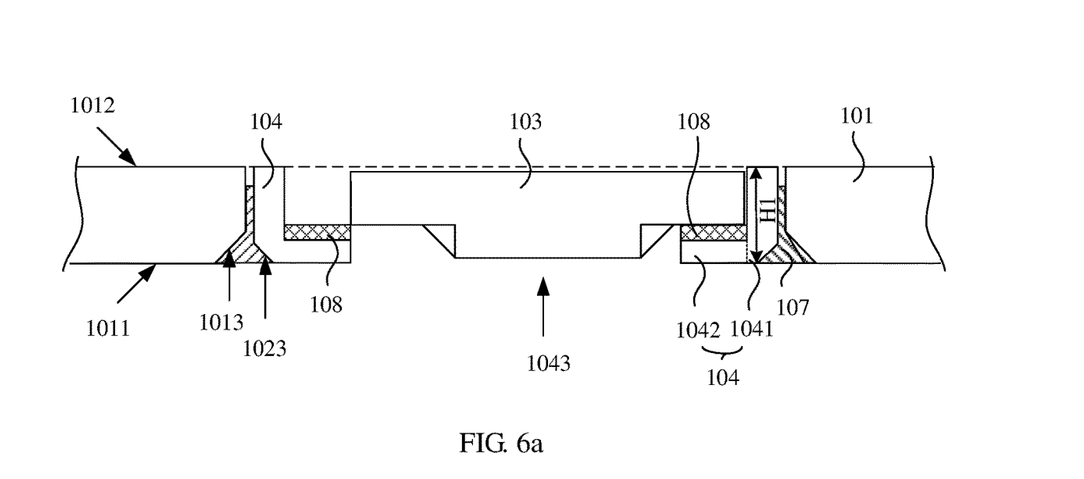
FIG. 6a, FIG. 6b, and FIG. 6c are schematic sectional views of several structures each including a fingerprint sensor and a fingerprint decorative component according to embodiments of this disclosure.

As shown in FIG. 6a, the cable of the fingerprint sensor 103 may be formed in the second through hole 1043, or may be extended out of the fingerprint decorative component 104 through the second through hole 1043. In this structure design, the height of the side wall 1041 of the fingerprint decorative component 104 may be decreased, and the overall thickness after the fingerprint sensor 103 and the fingerprint decorative component 104 are mounted may be further decreased, thereby optimizing the internal component space layout of the mobile phone 100. In some embodiments, a thickness of the fingerprint sensor 103 ranges from 0.5 mm to 1.0 mm, for example, 0.72 mm, and the height H1 of the side wall 1041 of the fingerprint decorative component 104 ranges from 0.5 mm to 1.0 mm, for example, 0.8 mm. When the fingerprint sensor 103 is accommodated in the fingerprint decorative component 104, the height of a surface of the fingerprint sensor 103 is not larger than the height of a surface of the fingerprint decorative component 104.

Still referring to FIG. 6a, in some embodiments, the fingerprint sensor 103 may be fixedly connected to an inner side of the bottom wall 1042 of the fingerprint decorative component 104 by using a connector 108. In other words, the connector 108 is disposed between the inner side of the bottom wall 1042 of the fingerprint decorative component 104 and the fingerprint sensor 103. When a thickness of the connector 108 allows the fingerprint sensor 103 to be accommodated in the fingerprint decorative component 104, the height of the fingerprint sensor 103 is not larger than that of the side wall 1041 of the fingerprint decorative component 104. The connector 108 may be a foam tape. The foam tape is used for bonding, and has a waterproof function and a shockproof function.

The cover 101 includes a first surface 1011 and a second surface 1012. In some embodiments, the cover 101 has a first slope 1013 in a direction from the first surface 1011 to the first through hole 102. Correspondingly, the side wall 1041 of the fingerprint decorative component 104 has a second slope 1023 in a direction from the bottom wall 1042 of the fingerprint decorative component 104 to the cover 101. The second slope 1023 and the first slope 1013 form a funnel-shaped opening, and the funnel-shaped opening is filled with the glue 107. The formed funnel-shaped opening helps to inject the glue in a mounting process, and ensures an amount of glue, thereby improving the bonding capability of the glue 107.

The first slope 1013 may be a flat slope, or may be a slope with a given concave curvature. The second slope 1023 may also be a flat slope, or may be a slope with a given concave curvature.

In some embodiments, the first slope 1013 and the second slope 1023 are flat slopes, and an opening angle of the funnel-shaped opening formed by the second slope 1023 and the first slope 1041 may be controlled from 60° to 120°, for example, 75°, 90°, or 115°. In some embodiments, an angle between the first slope 1013 and the first surface 1011 of the cover 101 is 45°, an angle between the second slope 1023 and the bottom wall 1042 of the fingerprint decorative component 104 is 45°, and the opening angle of the funnel-shaped opening formed after the second slope 1023 and the first slope 1013 are mounted is 90°.

In the mounting process, first, after the fingerprint decorative component 104 is aligned with the cover 101, the liquid glue 107 is injected from the funnel-shaped opening through glue dispensing, in which an amount of dispensed glue and an amount and a depth of injected glue can be controlled. After the glue 107 is cured, the fingerprint decorative component 104 is fastened to the cover 101.

A distance between a vertical surface of the side wall 1041 of the fingerprint decorative component 104 and an opposite vertical surface of the cover 101 ranges from 0.03 mm to 0.15 mm, for example, 0.06 mm, 0.08 mm, or 0.10 mm. The distance is controlled within this distance range to effectively control a glue amount of the glue 107, thereby ensuring a bonding capability of the glue 107.

Figure 6B:
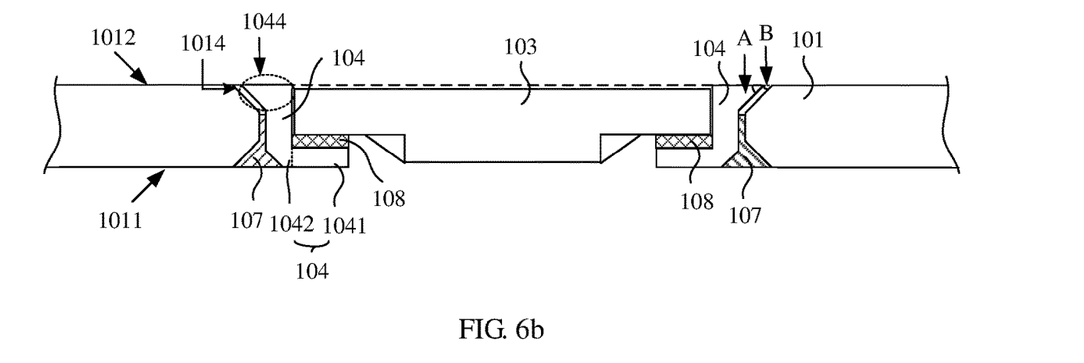

As shown in FIG. 6b, in some other embodiments, the cover 101 may further have a third slope 1014 in a direction from the second surface 1012 to the first through hole 102. The side wall 1041 of the fingerprint decorative component 104 has an annular protrusion 1044 close to the third slope 1014, and a protruding direction of the annular protrusion 1044 fits a direction of the third slope 1014 of the cover 101.

In some embodiments, the third slope 1014 may be a flat slope, a surface, opposite to the third slope 1014, of the annular protrusion 1044 may also be a flat slope, the two opposite surfaces may be parallel or basically parallel to each other, and a width of a gap formed between the two opposite surfaces is less than a width of a minimum gap from which the glue is able to flow out before the glue 107 is cured, to prevent excessive glue from flowing out from the gap. In this way, a requirement for controlling precision of the amount of dispensed glue may be lowered.

In some embodiments, the gap formed between the annular protrusion 1044 and the third slope 1014 may be less than 0.06 mm, for example, 0.01 mm, 0.03 mm, or 0.06 mm. In this way, C-shaped fitting space is reserved between the fingerprint decorative component 104 and the cover 101, so that the fingerprint decorative component 104 and the cover 101 do not affect each other in a mounting process. In addition, after fastening is implemented through glue dispensing, the cover 101 supports the fingerprint decorative component 104 and the fingerprint sensor 103, so that when being pressed by a finger, the fingerprint decorative component 104 is not pressed into glass and detached. In some other embodiments, alternatively, the annular protrusion 1044 and the third slope 1014 may be fully engaged.

In some embodiments, an acute angle A between the annular protrusion 1044 and the second surface 1012 of the cover 101 and an acute angle B between the third slope 1014 and the second surface 1012 of the cover 101 (namely, formed acute angles) are the same, and the acute angle A between a surface, opposite to the cover 101, of the annular protrusion 1044 and the second surface 1012 of the cover 101 ranges from 30° to 60°. With a slope design of the annular protrusion 1044, a collapse can be prevented when the fingerprint sensor 103 is pressed by a finger, the waterproof function can be achieved more effectively, and the appearance can have a better aesthetic feeling. In some embodiments, the acute angle B between the second slope 1023 and the first surface 1011 of the cover 101 is 45°, and the acute angle A between the surface, opposite to the cover 101, of the annular protrusion 1044 and the second surface 1012 of the cover 101 is 45°.

Figure 6C:
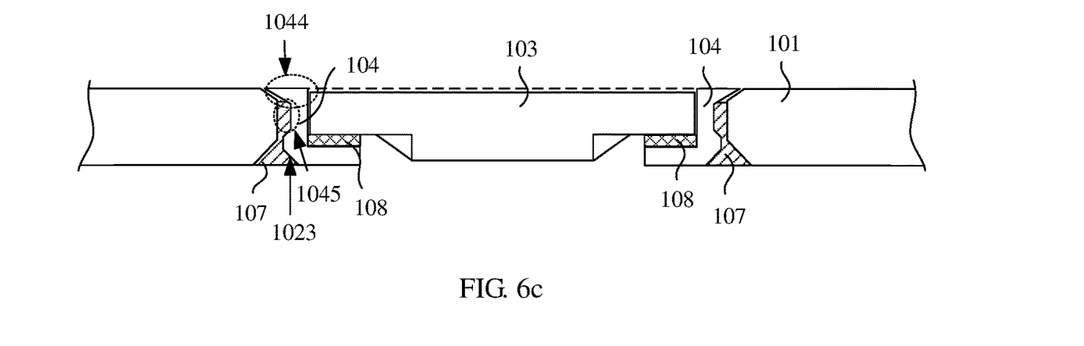

With reference to the foregoing embodiments, in an embodiment shown in FIG. 6c, the side wall 1041 of the fingerprint decorative component 104 has a recess 1045 between the second slope 1023 and the annular protrusion 1044, an opening of the recess 1045 faces the cover 101, and the recess 1045 is also filled with the glue 107. To further improve the bonding capability, a maximum distance between the recess 1045 and an opposite surface of the cover 101 ranges from 0.03 mm to 0.15 mm, for example, 0.05 mm.

In this embodiment of this disclosure, the glue 107 may be made from acrylic acid, and the glue 107 contains a sweat-resistant component that can effectively implement the waterproof function. With the glue 107, it can be ensured that the fingerprint decorative component 104 and the fingerprint sensor 103 are not detached from the mobile phone 100, and the fingerprint sensor 103 is not collapsed when being pressed by a finger. In some embodiments, fumed silica may be further added to the glue 107, to change stickiness of the glue, enhance a sweat corrosion resistance capability of the glue, and improve a drawing force feature in a complex use scenario. In addition, the glue 107 may not be limited to being made from the acrylic acid. When reliable drawing force is ensured in a complex use scenario (for example, sweat, thermal shock, or acid and alkali corrosion), the glue may be made from another type of bonding material such as modified silicone gel or modified epoxy resin.

An elastic modulus of the cured glue 107 ranges from 80 Mpa to 200 Mpa, for example, 90 Mpa, 100 Mpa, or 110 Mpa. Within this range of the elastic modulus of the cured glue 107, structural damage, for example, a crack of the cover 101 made of a glass or ceramic material, caused when the fingerprint decorative component 104 and the cover 101 squeeze each other due to heat deformation can be avoided. Therefore, the fingerprint decorative component 104 is fastened to the cover 101 through glue dispensing, and the fingerprint decorative component 104 is securely fastened to the cover 101 by adjusting the glue dispensing gap and the elastic modulus of the glue, to prevent a CG crack caused by thermal expansion and contraction when the fingerprint decorative component 104 and the cover 101 suffer a high and low temperature shock.

Therefore, in comparison with a structure in the prior art, in the structure of the electronic device provided in the embodiments of this disclosure, the fingerprint decorative component is fastened to the cover by using the glue, and no additional fastening plate and screw is required for fastening. In this way, an overall thickness and space occupied after the fingerprint sensor and the fingerprint decorative component are mounted are reduced, thereby improving overall space utilization of the electronic device. In addition, the glue has a waterproof function, so that a waterproof capability of the components is ensured, and a structure such as a waterproof ring is saved, thereby reducing manufacturing costs.

It should be noted that features in the embodiments of this disclosure may be combined in any manner provided that no conflict is caused.

The foregoing descriptions are merely specific implementations of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. A structure of an electronic device, comprising:
    a cover covering a surface of the electronic device, wherein the cover comprises a first surface and a second surface, and the cover has a first through hole and a first slope in a direction from the first surface to the first through hole;
    a fingerprint decorative component built in the first through hole, wherein the fingerprint decorative component comprises a side wall and a bottom wall that are integrally connected, the side wall of the fingerprint decorative component and the first slop of the cover form a funnel-shaped opening, the side wall of the fingerprint decorative component is fastened to the cover by glue, the funnel-shaped opening is filled with the glue, and the bottom wall of the fingerprint decorative component has a second through hole; and
    a fingerprint sensor accommodated in the fingerprint decorative component, wherein the fingerprint sensor is fixedly connected to the bottom wall of the fingerprint decorative component, and a cable of the fingerprint sensor is led out from the second through hole.

2. The structure according to claim 1, wherein
    the side wall of the fingerprint decorative component has a second slope in a direction from the bottom wall of the fingerprint decorative component to the cover, the second slope of the side wall and the first slope of the cover form the funnel-shaped opening.

3. The structure according to claim 2, wherein an opening angle of the funnel-shaped opening formed by the second slope and the first slope ranges from 60° to 120°.

4. The structure according to claim 1, wherein
    the cover has a second slope in a direction from the second surface to the first through hole; and
    the side wall of the fingerprint decorative component has an annular protrusion next to the second slope of the cover, and a protruding direction of the annular protrusion is aligned with a direction of the second slope of the cover.

5. The structure according to claim 4, wherein
    a gap between the annular protrusion and the second slope has a size such that the glue cannot flow out of the gap before the glue is cured.

6. The structure according to claim 4, wherein
    a surface, opposite to the cover, of the annular protrusion is parallel to the second slope, and an acute angle between the second slope and the second surface of the cover ranges from 30° to 60°.

7. The structure according to claim 1, wherein
    the side wall of the fingerprint decorative component has a second slope in the direction from the bottom wall of the fingerprint decorative component to the cover, the second slope of the side wall and the first slope of the cover form the funnel-shaped opening;
    the cover has a third slope in the direction from the second surface to the first through hole;
    the side wall of the fingerprint decorative component has an annular protrusion next to the third slope, and the annular protrusion is aligned with the direction of the third slope of the cover; and
    a recess is formed between the second slope of the side wall and the annular protrusion of the side wall, the recess is facing the cover, and the recess is filled with the glue.

8. The structure according to claim 1, wherein an elastic modulus of the glue ranges from 80 Mpa to 200 Mpa.

9. The structure according to claim 1, wherein the glue comprises acrylic acid and fumed silica, modified silicone gel, or modified epoxy resin.

10. The structure according to claim 1, wherein the fingerprint decorative component comprises metal, ceramic, plastic, or glass.

11. The structure according to claim 1, wherein the side wall of the fingerprint decorative component is in a circular or track shape, and a height of the side wall of the fingerprint decorative component ranges from 0.5 mm to 1.2 mm.

12. The structure according to claim 1, further comprising:
    a connector disposed between an inner side of the bottom wall of the fingerprint decorative component and the fingerprint sensor, wherein a thickness of the connector is configured to allow the fingerprint sensor to be accommodated in the fingerprint decorative component, a height of the fingerprint sensor is not larger than a height of the side wall of the fingerprint decorative component.

13. The structure according to claim 12, wherein the connector is a foam tape.

14. The structure according to claim 1, wherein the fingerprint sensor comprises:
    a fingerprint recognition chip and a package of the fingerprint recognition chip;
    a fingerprint cover covering the fingerprint recognition chip and the package of the fingerprint recognition chip; and
    a cable comprising a lead electrically connected to the fingerprint recognition chip and the package of the fingerprint recognition chip, a flexible circuit board being electrically connected to the lead.

15. The structure according to claim 1, wherein the funnel-shaped opening is shaped as a funnel when viewed from a direction substantially parallel to the cover.

16. An electronic device, wherein the electronic device comprises a structure, comprising:
    a cover covering a surface of the electronic device, wherein the cover comprises a first surface and a second surface, and the cover has a first through hole and a first slope in a direction from the first surface to the first through hole;
    a fingerprint decorative component built in the first through hole, wherein the fingerprint decorative component comprises a side wall and a bottom wall that are integrally connected, the side wall of the fingerprint decorative component and the first slope of the cover form a funnel-shaped opening, the side wall of the fingerprint decorative component is fastened to the cover by glue, the funnel-shaped opening is filled with the glue, and the bottom wall of the fingerprint decorative component has a second through hole; and a fingerprint sensor accommodated in the fingerprint decorative component, wherein the fingerprint sensor is fixedly connected to the bottom wall of the fingerprint decorative component, and a cable of the fingerprint sensor is led out from the second through hole.

17. The electronic device according to claim 16, wherein the side wall of the fingerprint decorative component has a second slope in a direction from the bottom wall of the fingerprint decorative component to the cover, the second slope of the side wall and the first slope of the cover form a funnel-shaped opening, and the funnel-shaped opening is filled with the glue.

18. The electronic device according to claim 16, wherein the cover has a second slope in a direction from the second surface to the first through hole; and
the side wall of the fingerprint decorative component has an annular protrusion next to the second slope, and a protruding direction of the annular protrusion is aligned with a direction of the second slope of the cover.

19. The electronic device according to claim 18, wherein a gap between the annular protrusion and the second slope has a size such that the glue is cannot flow out of the gap before the glue is cured.

20. The electronic device according to claim 18, wherein a surface, opposite to the cover, of the annular protrusion is parallel to the second slope, and an acute angle between the second slope and the second surface of the cover ranges from 30° to 60°.

21. The electronic device according to claim 16, wherein the side wall of the fingerprint decorative component has a second slope in the direction from the bottom wall of the fingerprint decorative component to the cover, the second slope of the side wall and the first slope of the cover form a funnel-shaped opening, and the funnel-shaped opening is filled with the glue;
the cover has a third slope in the direction from the second surface to the first through hole;
the side wall of the fingerprint decorative component has the annular protrusion next to the third slope of the cover, and the annular protrusion is aligned with the direction of the third slope of the cover; and
a recess is formed between the second slope of the side wall and the annular protrusion of the side wall, the recess facing the cover, and the recess is filled with the glue.

\* \* \* \* \*

UNITED STATES PATENT AND TRADEMARK OFFICE
CERTIFICATE OF CORRECTION

PATENT NO. : 11,379,000 B2
APPLICATION NO. : 16/755304
DATED : July 5, 2022
INVENTOR(S) : Bangshi Yin It is certified that error appears in the above-identified patent and that said Letters Patent is hereby corrected as shown below:

In the Claims

• Claim 1, at Column 9, Line 27, replace "slop" with "slope".

Signed and Sealed this
Second Day of August, 2022

Katherine Kelly Vidal
*Director of the United States Patent and Trademark Office*